United States Patent
Osawa

(10) Patent No.: US 6,825,267 B2
(45) Date of Patent: Nov. 30, 2004

(54) FLUORORUBBER COMPOSITIONS AND MAKING METHOD

(75) Inventor: Yasuhisa Osawa, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/457,410

(22) Filed: Jun. 10, 2003

(65) Prior Publication Data

US 2003/0232919 A1 Dec. 18, 2003

(30) Foreign Application Priority Data

Jun. 10, 2002 (JP) ........................................ 2002-168138

(51) Int. Cl.$^7$ .............................................. C08G 77/08
(52) U.S. Cl. ............................ 524/588; 528/24; 528/42
(58) Field of Search ............................ 524/588, 24, 42

(56) References Cited

U.S. PATENT DOCUMENTS

| | | | | |
|---|---|---|---|---|
| 4,061,704 A | * | 12/1977 | Barter | 264/83 |
| 6,297,339 B1 | * | 10/2001 | Osawa et al. | 528/15 |
| 6,576,701 B2 | * | 6/2003 | Osawa et al. | 524/520 |

| | | | |
|---|---|---|---|
| 2002/0111417 A1 | | 8/2002 | Kirochko et al. |

FOREIGN PATENT DOCUMENTS

| | | |
|---|---|---|
| EP | 0 967 251 A1 | 12/1999 |
| EP | 1 325 942 A1 | 9/2003 |
| JP | 2001-164115 A | 6/2001 |

OTHER PUBLICATIONS

Abstract JP 2001–106893 Apr. 17, 2001.
Abstract JP 2001–164115 Jun. 19, 2001.

* cited by examiner

Primary Examiner—Margaret G. Moore
(74) Attorney, Agent, or Firm—Birch, Stewart, Kolasch & Birch, LLP

(57) ABSTRACT

A fluororubber composition comprising (A) a liquid perfluoro compound having at least two alkenyl groups and a divalent perfluorolakylene or perfluoropolyether structure, (B) a compound capable of addition reaction having at least two hydrosilyl groups, components (A) and (B) being combined and precured in the presence of an addition reaction catalyst to form a precured base, (C) a reinforcing filler, and (D) a peroxide crosslinking agent containing an isopropyl monocarbonate group has improved solvent resistance, chemical resistance, heat resistance and low-temperature properties, as well as satisfactory rubber physical properties, especially strength.

9 Claims, No Drawings

FLUORORUBBER COMPOSITIONS AND MAKING METHOD

This invention relates to fluororubber compositions and a method for preparing the same, and more particularly, to peroxide-crosslinking fluororubber compositions having improved mechanical strength as well as good solvent resistance, chemical resistance, heat resistance, and low-temperature properties.

BACKGROUND OF THE INVENTION

Prior art vinylidene fluoride base fluororubbers are used in a variety of applications mainly in the automobile and machinery industries since they are elastomers having good heat resistance and mechanical strength.

These fluororubbers, however, are not satisfactory in chemical resistance. They are readily swollen in polar solvents such as ketone, lower alcohol, carbonyl and organic acid solvents. They are deteriorated by amine-containing chemicals so that their rubber strength and elongation may substantially decline.

In order to eliminate these drawbacks, curable fluorine-containing compositions comprising a perfluoro compound and a fluorinated organohydrogenpolysiloxane as main components were proposed. These compositions, however, are liquid because they are based on liquid perfluoro compounds having a low degree of polymerization. Then the compositions are suitable in the formed in-place gasket (FIPG) process and liquid injection molding system (LIMS), but less effective in compression molding commonly employed for rubber molding.

In particular, the curable fluorine-containing compositions often prohibit the use of conventional two-plate molds for rubber because of the difficulty of molding and the frequent occurrence of defects by air entrapment. Steady production is difficult unless a special LIMS mold is newly fabricated. The LIMS mold, however, has the problems that it is generally more expensive than the conventional two-plate molds for rubber, the mounting of the mold in a LIMS molding machine is cumbersome, and the molding machine requires time-consuming adjustment after mold mounting. The LIMS mold does not lend itself to the manufacture of a variety of parts in small quantities.

Under the circumstances, the applicant/assignee previously proposed in JP-A 2001-164115 (corresponding to U.S. Ser. No. 09/729,774 or U.S. 2001-0008914A) a method for preparing a rubber composition of the type that can be roll milled and molded in a compression molding rubber mold, referred to as millable composition, from a fluorinated curable composition comprising a perfluoro compound and a fluorinated organohydropolysiloxane as main components.

Although the curable composition of our previous proposal exhibits satisfactory physical properties when addition crosslinked, the addition crosslinking suffers from a crosslink-inhibitory problem that the catalyst is deactivated by compounds containing N, S, P or similar atoms, commonly known as catalyst poisons.

In actual rubber molding locations, compounds containing N, S, P or similar atoms are commonly used as the crosslinking agent or antioxidant for synthetic rubber. These compounds deposited on twin rolls or mold can become catalyst poisons to give rise to the crosslink-inhibitory problem.

A switch to peroxide crosslinking can avoid the catalyst poison. It was found that if the composition of the above proposal is converted to a peroxide crosslinking system, the physical properties, especially strength, are degraded as compared with the addition crosslinking.

SUMMARY OF THE INVENTION

Therefore, an object of the invention is to provide a peroxide crosslinking fluororubber composition having improved mechanical strength as well as good solvent resistance, chemical resistance, heat resistance, and low-temperature properties, and a method for preparing the same.

It has been found that a fluororubber composition comprising a precured base obtained by combining (A) a liquid perfluoro compound and (B) a compound capable of addition reaction having at least two hydrosilyl groups and precuring them in the presence of an addition reaction catalyst, (C) a reinforcing filler, and (D) a peroxide crosslinking agent containing an isopropyl monocarbonate group exhibits good heat resistance, solvent resistance, chemical resistance, and low-temperature properties and experiences a minimal decline of physical properties, especially strength, despite peroxide crosslinking.

Accordingly, the present invention provides a fluororubber composition comprising (A) a liquid perfluoro compound having at least two alkenyl groups in the molecule and a divalent perfluorolakylene or perfluoropolyether structure in the backbone, (B) a compound capable of addition reaction having at least two hydrosilyl groups in the molecule, components (A) and (B) being combined in such amounts as to give a molar ratio of hydrosilyl groups in component (B) to alkenyl groups in component (A) of 0.1/1 to 0.99/1 and precured in the presence of an addition reaction catalyst to form a precured base, (C) 1 to 100 parts by weight per 100 parts by weight of component (A) of a reinforcing filler, and (D) 0.1 to 10 parts by weight per 100 parts by weight of component (A) of a peroxide crosslinking agent containing an isopropyl monocarbonate group in the molecule.

The fluororubber composition is prepared through the steps of combining components (A) to (C) for reaction and then adding and mixing component (D) with the resulting mixture.

DESCRIPTION OF THE PREFERRED EMBODIMENTS

Component (A)

Component (A) in the fluororubber composition of the invention is a liquid perfluoro compound having at least two alkenyl groups in the molecule and a divalent perfluoroalkylene or divalent perfluoropolyether structure in the backbone.

The perfluoro compound (A) is technically difficult to synthesize into a high molecular weight polymer as typified by a resin or rubber. The perfluoro compound should have at least two alkenyl groups in the molecule and a divalent perfluoroalkylene or divalent perfluoropolyether structure in the backbone. It is preferably a linear perfluoro compound having a viscosity of about 25 to about 1,000,000 centistokes (cSt) at 25° C.

The perfluoro compound is typically of the following general formula (1).

$$CH_2=CH-(X)_p-(Rf-Q)_q-Rf-(X')_p-CH=CH_2 \qquad (1)$$

Herein, X is independently —CH$_2$—, —CH$_2$O—, —CH$_2$OCH$_2$— or —Y—NR$^1$—CO— wherein Y is a divalent group represented by —CH$_2$— or the structural formula (I):

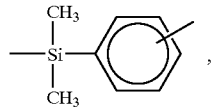

and R$^1$ is hydrogen or a substituted or unsubstituted monovalent hydrocarbon group; X' is independently —CH$_2$—, —OCH$_2$—, —CH$_2$OCH$_2$— or —CO—NR$^1$—Y'— wherein Y' is a divalent group represented by —CH$_2$— or the structural formula (I'):

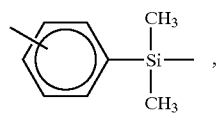

and R$^1$ is as defined above.

Rf is a divalent perfluoroalkylene group or divalent perfluoropolyether group. Letter p is independently equal to 0 or 1, and "a" is an integer inclusive of 0.

Q is a group of the following general formula (2), (3) or (4).

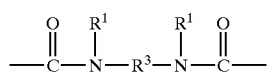

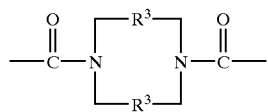

In the above formulae, X, X', p, and R$^1$ are as defined above; R$^3$ is a substituted or unsubstituted divalent hydrocarbon group; and R$^4$ is a substituted or unsubstituted divalent hydrocarbon group which may be separated by at least one intervening atom selected from oxygen, nitrogen, silicon and sulfur atoms, or a group of the following general formula

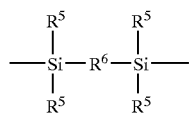

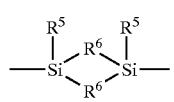

R$^5$ is a substituted or unsubstituted monovalent hydrocarbon group and R$^6$ is a group containing in its backbone structure at least one atom selected from carbon, oxygen, nitrogen, silicon and sulfur atoms.

Specifically, Rf is a divalent perfluoroalkylene group or divalent perfluoropolyether group. The divalent perfluoroalkylene group is preferably represented by the formula: —C$_m$F$_{2m}$— wherein m is from 1 to 10, preferably 2 to 6. The divalent perfluoropolyether group is preferably represented by the formula:

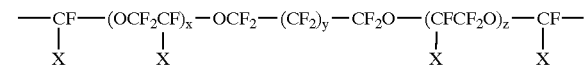

wherein X is F or CF$_3$, x, y and z are integers satisfying x≧1, z≧1, 2≦x+z≦200, especially 2≦x+z≦110, and 0≦y≦6,

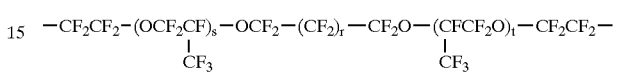

wherein r, s and t are integers satisfying 0≦r≦6, s≧0, t≧0, 0≦s+t≦200, especially 2≦s+t≦110,

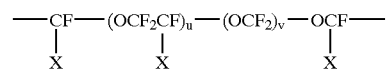

wherein X is F or CF$_3$, u is an integer of 1 to 100 and v is an integer of 1 to 50, or

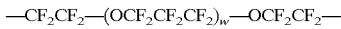

wherein w is an integer of 1 to 100.

Illustrative examples of Rf are given below.

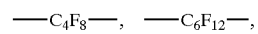

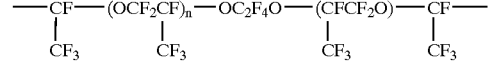

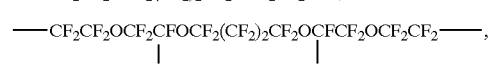

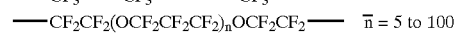

Q is a group of the following general formula (2), (3) or (4).

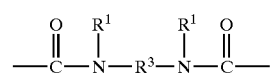

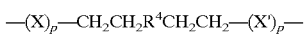

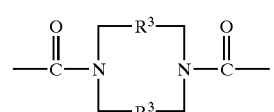

R$^1$ is hydrogen or a substituted or unsubstituted monovalent hydrocarbon group. The substituted or unsubstituted monovalent hydrocarbon groups are preferably those of 1 to 12 carbon atoms, for example, alkyl groups such as methyl, ethyl, propyl, isopropyl, butyl, isobutyl, tert-butyl, pentyl, neopentyl, hexyl, heptyl, octyl, nonyl and decyl; cycloalkyl groups such as cyclopentyl, cyclohexyl, and cycloheptyl; aryl groups such as phenyl, tolyl, xylyl and naphthyl; aralkyl groups such as benzyl, phenylethyl and phenylpropyl; and substituted ones of these groups in which some or all of the hydrogen atoms are replaced by halogen atoms such as fluoro, chloro and bromo, for example, chloromethyl, bromoethyl, chloropropyl, trifluoropropyl, and 3,3,4,4,5,5,6,6,6-nonafluorohexyl.

$R^3$ is a substituted or unsubstituted divalent hydrocarbon group. The substituted or unsubstituted divalent hydrocarbon groups are preferably those of 1 to 10 carbon atoms, more preferably 2 to 6 carbon atoms. Examples include alkylene groups such as methylene, ethylene, propylene, methylethylene, butylene, and hexamethylene; cycloalkylene groups such as cyclohexylene; arylene groups such as phenylene, tolylene, xylylene, naphthylene, and biphenylene; and substituted ones of these groups in which some of the hydrogen atoms are replaced by halogen atoms. It is noted that in formula (4), two $R^3$ groups may be identical or different.

$R^4$ is a substituted or unsubstituted divalent hydrocarbon group which may be separated by at least one intervening atom selected from oxygen, nitrogen, silicon and sulfur atoms. Alternatively, $R^4$ is a group of the following general formula (5) or (6):

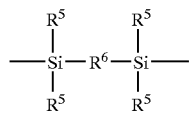

(5)

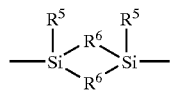

(6)

wherein $R^5$ is a substituted or unsubstituted monovalent hydrocarbon group and $R^6$ is a group containing in its backbone structure at least one atom selected from carbon, oxygen, nitrogen, silicon and sulfur atoms.

In formulae (5) and (6) representing the groups of $R^4$, the monovalent hydrocarbon groups represented by $R^5$ are the same as the substituted or unsubstituted monovalent hydrocarbon groups described for $R^1$. Exemplary groups represented by $R^6$ are substituted or unsubstituted divalent hydrocarbon groups, preferably of 1 to 20 carbon atoms, more preferably 1 to 10 carbon atoms, for example, alkylene groups such as methylene, ethylene, propylene, methylethylene, butylene, and hexamethylene, cycloalkylene groups such as cyclohexylene, arylene groups such as phenylene, tolylene, xylylene, naphthylene, and biphenylene, substituted ones of these groups in which some of the hydrogen atoms are replaced by halogen atoms, etc., and combinations of these substituted or unsubstituted alkylene and arylene groups.

Other examples of the groups represented by $R^6$ are divalent groups containing one or more oxygen, nitrogen, silicon and sulfur atoms in their backbone structure. In the divalent groups, the oxygen atom may intervene in the form of —O—, the sulfur atom may intervene in the form of —S—, and the nitrogen atom may intervene in the form of —NR— wherein R is hydrogen, alkyl of 1 to 8 carbon atoms, preferably 1 to 6 carbon atoms, or aryl. The silicon atom may intervene in the form of an organosiloxane-containing group or organosilylene group. Illustrative examples are given below.

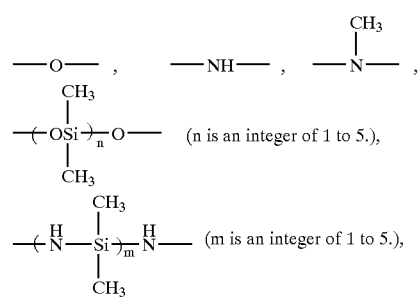

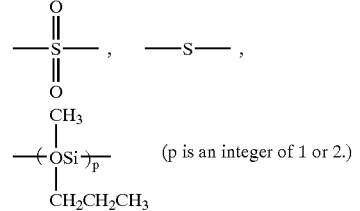

On the other hand, the substituted or unsubstituted divalent hydrocarbon groups represented by $R^4$, which may be separated by at least one atom selected from oxygen, nitrogen, silicon and sulfur atoms, include the substituted or unsubstituted divalent hydrocarbon groups described for $R^6$ and those of the same groups in which an oxygen, nitrogen, silicon and/or sulfur atom intervenes midway.

In formula (1), the Q groups represented by formulae (2), (3) and (4) are exemplified by the following groups. Note that in the following formulae, Me is methyl, Ph is phenyl, and R is hydrogen, methyl or phenyl.

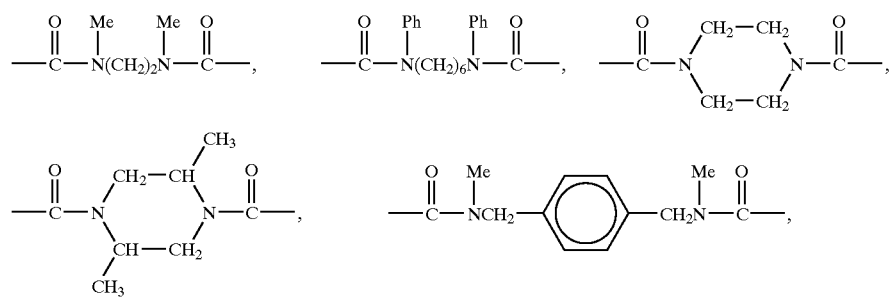

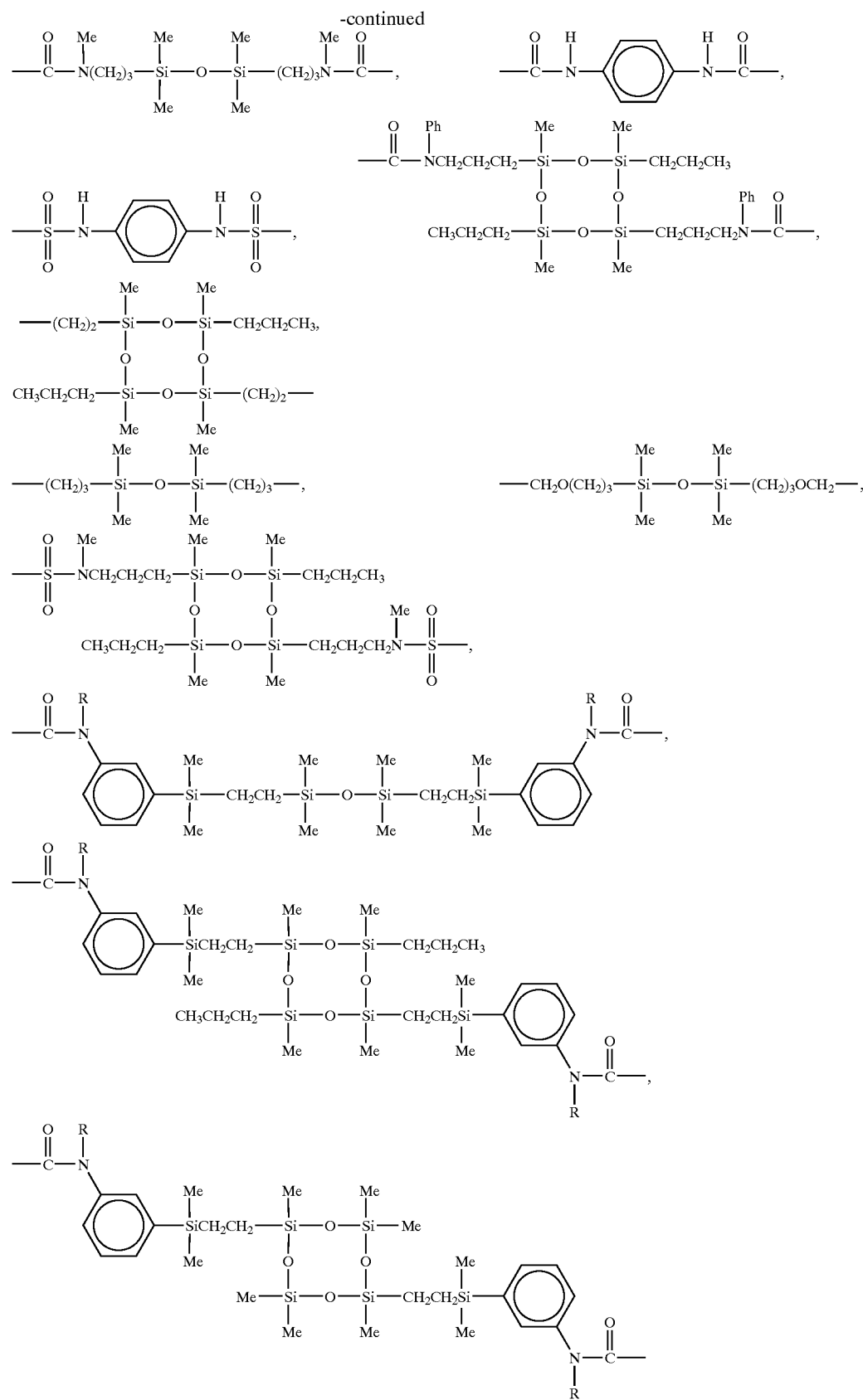

In formula (1), "a" is an integer inclusive of 0. Therefore, the fluorinated compound of formula (1) contains at least one divalent perfluoroalkylene or divalent perfluoropolyether group per molecule. Preferably, "a" is an integer of 0 to 10, especially 0 to 6.

X is independently selected from among —CH$_2$—, —CH$_2$O—, —CH$_2$OCH$_2$— and —Y—NR$^1$—CO— wherein Y is a divalent group represented by —CH$_2$— or the structural formula (I):

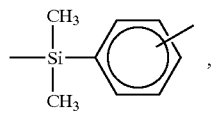
(I)

and R$^1$ is hydrogen or a substituted or unsubstituted monovalent hydrocarbon group, and preferably methyl, phenyl or allyl.

X' is independently selected from among —CH$_2$—, —OCH$_2$—, —CH$_2$OCH$_2$—, and —CO—NR$^1$—Y'— wherein Y' is a divalent group represented by —CH$_2$— or the structural formula (I'):

(I')

and R$^1$ is as defined above.

Letter p is equal to 0 or 1. The perfluoro compound of formula (1) has a vinyl, allyl or analogous group at either end.

Illustrative examples of the perfluoro compound represented by formula (1) are the linear fluoropolyether compounds shown below.

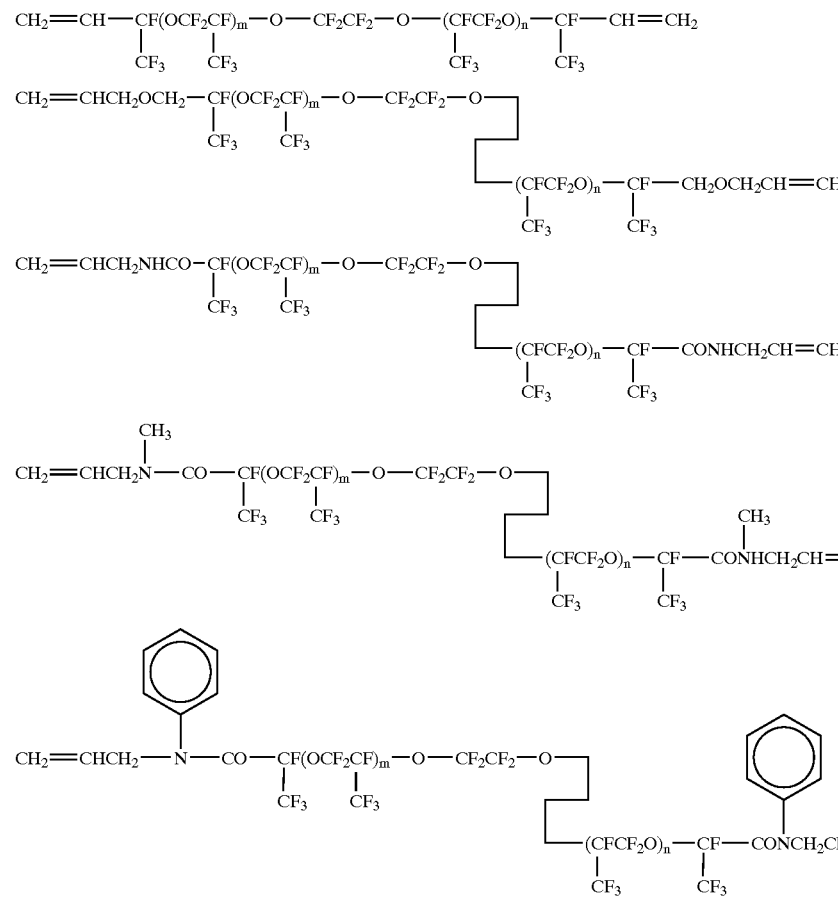

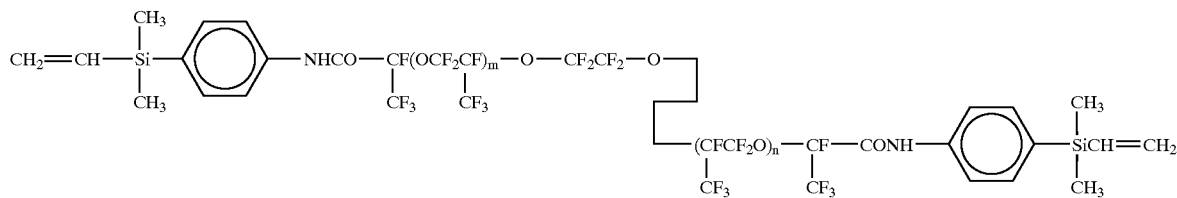

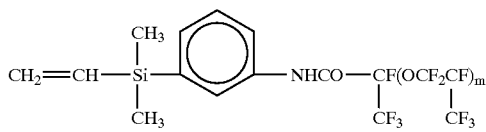
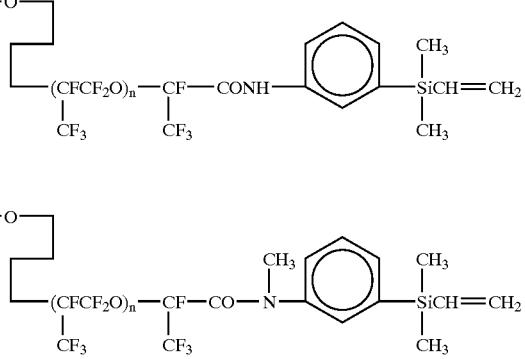

Herein, m and n are integers inclusive of 0, preferably such integers that the compounds may have a viscosity of about 25 to about 1,000,000 cSt at 25° C.

The linear perfluoro compound (A) should preferably have a viscosity of about 25 to about 1,000,000 cSt at 25° C., more preferably about 100 to about 60,000 cSt at 25° C. At a viscosity outside the range, there would arise inconvenient problems including difficulty to form a cured rubber product having the desired properties and poor workability.

Component (B)

Component (B) is a compound having at least two hydrosilyl groups in the molecule and capable of addition reaction with alkenyl groups. It may be either an organic compound having hydrosilyl groups or an organosilicon compound having hydrosilyl groups although compounds of the following formulae (7) and (8) are preferred for ease of dispersion and heat resistance.

$$Z-CH_2CH_2-(X)_p-Rf-(X')_p-CH_2CH_2-Z \quad (7)$$

$$Rf-(X)_p-CH_2CH_2-Z \quad (8)$$

In the formulae, X, X', p, and Rf are as defined above,
Z is a group of the general formula (9):

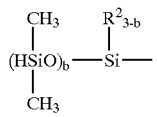 (9)

wherein $R^2$ is a substituted or unsubstituted monovalent hydrocarbon group, and b is 1, 2 or 3 in the case of formula (7) and 2 or 3 in the case of formula (8).

Herein, X is independently $-CH_2-$, $-CH_2O-$, $-CH_2OCH_2-$ or $-Y-NR^1-CO-$ wherein Y is a divalent group represented by $-CH_2-$ or the structural formula (I):

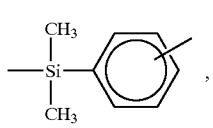 (I)

and $R^1$ is hydrogen or a substituted or unsubstituted monovalent hydrocarbon group; X' is independently $-CH_2-$, $-OCH_2-$, $-CH_2OCH_2-$ or $-CO-NR^1-$ Y'— wherein Y' is a divalent group represented by $-CH_2-$ or the structural formula (I'):

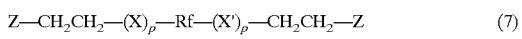 (I')

and $R^1$ is as defined above.
Rf is a divalent perfluoroalkylene group or divalent perfluoropolyether group. Letter p is independently equal to 0 or 1.

Illustrative examples of Rf, X, X' and p are as described above. Rf, X, X' and p in formula (7) or (8) may be identical with or different from Rf, X, X' and p in formula (1), respectively.

Z is a group of formula (9).

 (9)

Herein, $R^2$ is a substituted or unsubstituted monovalent hydrocarbon group. The substituted or unsubstituted monovalent hydrocarbon groups are preferably those of 1 to 8 carbon atoms, for example, alkyl groups such as methyl, ethyl, propyl, isopropyl, butyl, isobutyl, tert-butyl, pentyl, neopentyl, hexyl, heptyl, and octyl; cycloalkyl groups such as cyclopentyl, cyclohexyl, and cycloheptyl; aryl groups such as phenyl, tolyl, and xylyl; aralkyl groups such as benzyl and phenylethyl; and substituted ones of these groups in which some or all of the hydrogen atoms are replaced by halogen atoms such as fluoro, chloro and bromo or the like, for example, chloromethyl, bromoethyl, chloropropyl, trifluoropropyl, and 3,3,4,4,5,5,6,6,6-nonafluorohexyl.

Letter b is equal to 1, 2 or 3 for the compound of formula (7) and equal to 2 or 3 for the compound of formula (8).

Component (B) is used in such amounts that the molar ratio of hydrosilyl groups in component (B) to alkenyl groups in component (A) may range from 0.1/1 to 0.99/1, especially from 0.3/1 to 0.8/1. With a ratio of less than 0.1, the resulting polymer merely thickens to some extent and remains still flowable, that is, becomes a liquid rubber which is difficult to sheet by means of a two-roll rubber mill. With a ratio in excess of 0.99, the resulting polymer would become cured rubber to which a filler is added with difficulty or which cannot be wrapped around rolls.

Component (C)

Component (C) in the fluororubber composition of the invention is a reinforcing filler. The reinforcing filler is generally added for the purposes of improving roll workability, mechanical strength, thermal stability, weather resistance, chemical resistance and flame retardance, reducing thermal shrinkage upon curing, and/or reducing the coefficient of thermal expansion and gas permeability of an elastomer as cured. The filler is mainly added for the purpose of improving roll workability and mechanical strength in order to provide a rubber composition of the millable type.

The fillers include fumed silica, colloidal silica, diatomaceous earth, quartz flour, glass fibers, and carbon as well as metal oxides such as iron oxide, titanium oxide and cerium oxide and metal carbonates such as calcium carbonate and magnesium carbonate. The fillers may have been treated with various surface treating agents. Among others, fumed silica is preferred for mechanical strength. Fumed silica treated with a surface treating agent in the form of a compound containing silicon in a molecule such as a silane is especially preferred because it is readily dispersible.

The amount of the reinforcing filler blended is 1 to 100 parts by weight per 100 parts by weight of component (A). Less than 1 part of the filler is insufficient to provide reinforcement and improve roll workability whereas more than 100 parts of the filler detracts from rubber flexibility and prevents the rubber from being wrapped on rolls.

If desired, when compounding the reinforcing filler (C), a surface treating agent may be added. The surface treating agent is effective for improving the wettability between the filler and the polymer for facilitating the blending and dispersion of the filler and hence, compounding operation so that the resulting composition is improved in mechanical strength. Accordingly, the surface treating agent should preferably bear in its molecule at least one silanol group having affinity to the filler surface and at least one fluoroalkyl or fluoropolyalkyl ether group having affinity to the perfluoro backbone of the polymer.

In the practice of the invention, components (A) and (B), preferably components (A), (B) and (C) are combined and precured in the presence of an addition reaction catalyst to form a precured base, which is compounded in the composition.

Preferred addition reaction catalysts are platinum group metal compounds. The platinum group metal compounds used herein are generally compounds of noble metals which are expensive. For ease of availability, platinum compounds are often employed. Examples of the platinum compounds include, but are not limited to, chloroplatinic acid, complexes of chloroplatinic acid with olefins (e.g., ethylene), complexes of chloroplatinic acid with alcohols or vinylsiloxanes, and platinum on silica, alumina or carbon. Known as platinum group metal compounds other than the platinum compounds are compounds of rhodium, ruthenium, iridium and palladium, for example, $RhCl(PPh_3)_3$, $RhCl(CO)(PPh_3)_2$, $RhCl(C_2H_4)_2$, $Ru_3(CO)_{12}$, $IrCl(CO)(PPh_3)_2$, and $Pd(PPh_3)_4$.

The amount of the catalyst used is not critical and the desirable curing rate will be achieved with a catalytic amount. From the economical aspect or in order to obtain favorable cured products, an appropriate amount of the catalyst is about 0.1 to about 1,000 ppm, more preferably about 0.1 to about 500 ppm of platinum group metal based on the weight of components (A) and (B) combined.

The conditions for the addition reaction for precure may be determined as appropriate. Reaction may be carried out at room temperature. Reaction is accelerated by heating at about 100 to 200° C. whereby the reaction is completed within about 10 seconds to 60 minutes.

Component (D)

The peroxide crosslinking agent (D) is an important additive in the invention. Depending on the type and amount of the crosslinking agent, the physical properties of the rubber or cured composition largely vary.

It is preferred that upon cleavage, the peroxide generate stable radicals and desirably yield no side-reaction products. The decomposition by-products which often generate upon cleavage of peroxides are low-boiling, polar organic compounds containing oxygen in the molecule as typified by acetone.

In the event of silicone rubber, which is gas permeable and readily swells in organic solvents, the by-product such as acetone, if generated, penetrates therethrough and uniformly disperses through molecular level diffusion. A choice of peroxide need not take into account the by-product gas.

In the event of vinylidene fluoride-containing fluororubber, the by-product is adsorbed on an alkali substance which is often compounded as an acid acceptor. A polar compound such as acetone causes the fluororubber to readily swell and hence, uniformly disperses through molecular level diffusion. Accordingly, as in the event of silicone rubber, a choice of peroxide for the vinylidene base fluororubber need not take into account the by-product gas.

In contrast, the fluororubber composition of the invention is stable to and little swells in almost all organic materials including polar solvents such as acetone. If a decomposition by-product generates, it takes a time for the by-product to uniformly disperse. During crosslinking reaction, the decomposition by-product remains unevenly within the composition in the stagnant gas state, giving adverse impact to the crosslinking.

Therefore, a peroxide of the type that generate little or no decomposition by-product is suited for the inventive composition. As the peroxide chemical structure generating little or no decomposition by-product, the invention uses a peroxide containing an isopropyl monocarbonate group in the molecule.

Specific examples include tert-butylperoxy isopropyl monocarbonate, tert-hexylperoxy isopropyl monocarbonate, diisopropylperoxy dicarbonate, cumylperoxy isopropyl monocarbonate, and benzoylperoxy isopropyl monocarbonate. Of these, tert-butylperoxy isopropyl monocarbonate represented by the formula (10) below is most preferred for ease of compounding, storage stability and crosslinking properties as the rubber crosslinking agent.

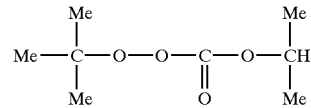

(10)

Note that Me is methyl.

The peroxide crosslinking agent is added in a sufficient amount to cure component (A), preferably 0.1 to 10 parts by weight, more preferably 0.5 to 5 parts by weight per 100 parts by weight of component (A). Less than 0.1 part of the peroxide may induce insufficient or slow crosslinking whereas more than 10 parts may adversely affect the physical properties of rubber.

The inventive composition remains fully stable provided the above-mentioned components are included. If desired, a heat resistance modifier such as carbon black, metal oxides or metal hydroxides may be added to the composition. It is believed that the modifier serves to improve heat resistance by absorbing or neutralizing radicals and acidic substances such as hydrogen fluoride generated at high temperature.

The modifier is generally available in powder form. As opposed to the reinforcing filler (C), the modifier is added not for the purpose of improving mechanical strength, but for the purpose of adsorbing or neutralizing radicals and acidic substances generated at high temperature. If the modifier is surface treated, its surface activity is lost so that its addition effect becomes low. It is thus undesired to surface treat the modifier or add the modifier simultaneously with a surface treating agent.

Examples of useful carbon black include lamp black, various furnace black species and acetylene black. Of these, acetylene black is preferred since it eliminates any potential influence on crosslinking properties and rubber properties by impurities.

The metal oxides include iron oxide, calcium oxide, magnesium oxide, zinc oxide, lead oxide, copper oxide, titanium oxide, aluminum oxide, cadmium oxide, cobalt oxide and cerium oxide. Of these, magnesium oxide, iron oxide and cerium oxide are preferred since they are easy to compound in rubber and remain stable in the compound.

Useful metal hydroxides include potassium hydroxide, calcium hydroxide, magnesium hydroxide, zinc hydroxide, and aluminum hydroxide. Of these, calcium hydroxide is preferred since it is more stable and safe to handle.

The addition of the modifier alone is effective for improving heat resistance although the addition of two or more modifiers achieves a greater improvement. Whether the modifier is added alone or in admixture of two or more, an appropriate amount of the modifier is 0.01 to 10 parts by weight per 100 parts by weight of component (A). Less than 0.01 part may achieve little improvement in heat resistance. More than 10 parts of the modifier may adversely affect the mechanical strength of the rubber because it lacks reinforcement effect unlike fumed silica. More preferably the modifier is used in an amount of 0.1 to 5 parts by weight so that the resulting fluororubber composition may possess both mechanical strength and heat resistance.

The method for preparing the fluororubber composition of the invention involves the first step of combining components (A) to (C) and effecting precure and the second step of compounding component (D) in the resulting mixture.

In the first step, any kneading machine for conventional rubber compounding such as a rubber kneader, pressure kneader or Banbury mixer may be used. The mixing of components (A) to (C) proceeds at room temperature without trouble although heating may be employed for purposes of stabilizing shear heat and so on, in the temperature range where the polymer is not decomposed. Heating at 100 to 300° C. for about 10 minutes to 8 hours is desirable for such purposes.

It is important that the first step serves to cause crosslinking to some reactive groups in the perfluoro compound utilizing hydrosilyl groups in component (B), for thereby building up the molecular weight. In this sense, the first step is also referred to as precure step. Through the precure step, the liquid or paste composition resulting from simple mixing is converted to a millable composition which is workable on a two-roll rubber mill. Unless a molecular weight buildup is achieved in this step, the composition becomes difficult to work or sheet on a rubber roll mill.

In the second step, either a kneading machine such as the kneader used in the first step or a twin-roll rubber mill may be used. The shear heat during the mixing must be carefully controlled because of the risk of a scorching phenomenon that the peroxide can be decomposed to drive crosslinking forward during the mixing operation.

Desirable is a kneading machine equipped with cooling means. Safety is assured if compounding is effected while keeping the material at a temperature below about 100° C., preferably below about 80° C. and completed within 60 minutes.

The fluororubber composition of the invention eliminates any concern about crosslink inhibition by a catalyst poison as compared with conventional addition crosslinking. It can be molded using twin-roll rubber mills and molds commonly used by processing manufacturers.

The invention eliminates a decline of physical properties which frequently occurs with a switch to the peroxide crosslinking and endows rubber with physical properties, especially strength, substantially comparable to those achieved by the addition reaction.

For the above reason, the inventive composition eliminates a decline of physical properties and is easy for processing manufacturers to handle.

The fluororubber compositions of the invention can be used in a variety of applications. Due to a high fluorine content, they have excellent solvent resistance and chemical resistance, and low moisture permeability. Also, due to low surface energy, they have excellent parting properties and water repellency. The compositions thus find use as automotive rubber parts where oil resistance is required, for example, diaphragms such as fuel regulator diaphragms, pulsation damper diaphragms, oil pressure switch diaphragms, and EGR diaphragms, valves such as canister valves and power control valves, O-rings such as quick connector O-rings and injector O-rings, and seal members such as oil seals and cylinder head gaskets; chemical plant rubber parts, for example, pump diaphragms, valves, O-rings, packing members, oil seals, gaskets and other seal members; rubber parts for ink jet printers, rubber parts for semiconductor manufacturing lines, for example, diaphragms, valves, O-rings, packing members, gaskets and seal members for apparatus to come in contact with chemicals, and valves which are required to have low friction and abrasion resistance; rubber parts for analytical and experimental equipment, such as pump diaphragms, valves, seal members (e.g., O-rings and packing); rubber parts for medical equipment, such as pumps, valves and joints; and tent coating materials, sealants, molded parts, extruded parts, coats, copier roll materials, electrical moisture-proof coatings, sensor potting materials, fuel cell sealing materials, and laminate rubber fabrics.

EXAMPLE

Examples of the invention are given below by way of illustration and not by way of limitation. In Examples, all parts are by weight and the viscosity is as measured at 25° C.

The materials, compounding method and evaluation method used in Examples are as shown below.

Polymer (Perfluoro Compound):

viscosity 4,400 cSt average molecular weight 16,500 vinyl content 0.013 mol/100 g

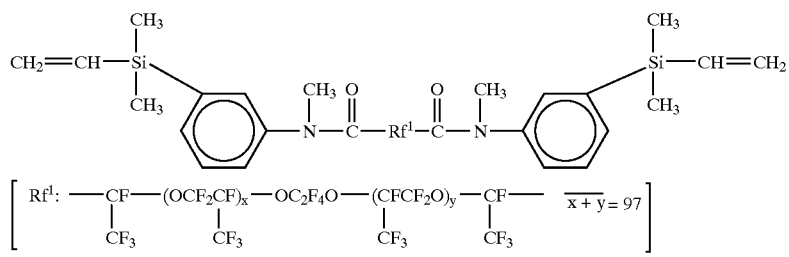

Precure Crosslinker (Addition Reaction Crosslinker):

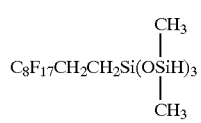

Surface Treating Agent:

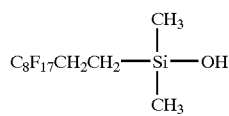

Addition Reaction Crosslinker (Used in Comparative Examples 7, 8)

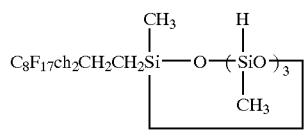

Addition Reaction Catalyst:

PL50T (platinum compound catalyst by Shin-Etsu Chemical Co., Ltd.)

Reinforcing Filler:

R976 (fumed silica treated with silicon-base surface treating agent by Nippon Aerosil K.K.)

Reaction Regulator (Used in Comparative Examples 7, 8):

ethynyl cyclohexanol, 50% toluene solution

Carbon Black (Heat Resistance Modifier)

Denka Black (acetylene black by Denki Kagaku Kogyo K.K.)

Inventive Peroxide:

Perbutyl I (trade name by NOF Corp., tert-butylperoxy isopropyl monocarbonate)

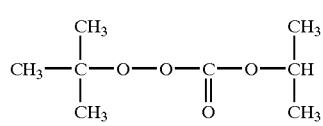

Comparative Peroxide 1:

Perhexa 25B (trade name by NOF Corp.)

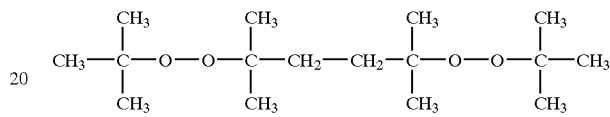

Comparative Peroxide 2:

Perbutyl P (trade name by NOF Corp.)

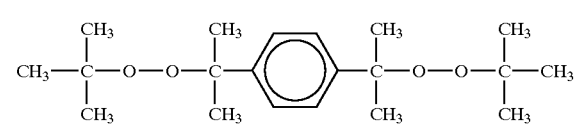

Comparative Peroxide 3:

Perbutyl Z (trade name by NOF Corp.)

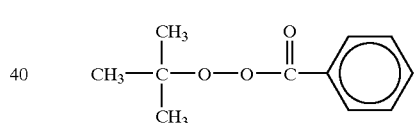

Comparative Peroxide 4:

Perbutyl D (trade name by NOF Corp.)

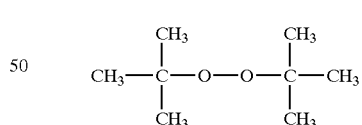

Comparative Peroxide 5:

Perhexa 3M (trade name by NOF Corp.)

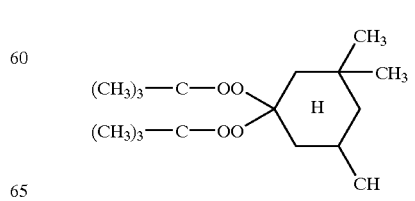

Comparative Peroxide 6:
Perhexyne 25B (trade name by NOF Corp.)

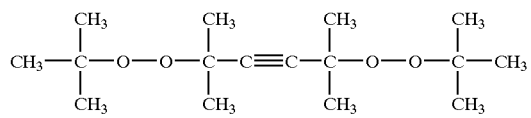

Compounding of Base Composition

After a laboratory 5-liter pressure kneader was heated to an interior temperature of 170° C., the polymer, precure crosslinker, catalyst, filler, surface treating agent and heat resistance modifier were admitted thereto in accordance with the formulation shown in Table 1.

After the addition of the filler, kneading was continued at the temperature for one hour, obtaining a base composition.

TABLE 1

| Formulation | Additives | Amount (pbw) |
|---|---|---|
| Base composition | Polymer | 100 |
| | Precure crosslinker | 1.8 |
| | Catalyst | 0.2 |
| | Reinforcing filler | 35 |
| | Surface treating agent | 6 |
| | Heat resistance modifier (carbon) | 1 |

On a twin-roll mill, the crosslinking agent of Example or Comparative Example was incorporated in the base composition to form a crosslinkable fluororubber composition.

Using a 75-ton rubber press, the crosslinkable fluororubber composition was press worked at a temperature between 150° C. and 190° C. for 10 minutes into a rubber sheet of 2 mm thick and post-cured at 200° C. for 4 hours. The sheet was measured for physical properties (hardness, elongation, tensile strength) by the JIS rubber rating method.

Examples 1 to 6

The inventive peroxide, Perbutyl I was added to the base composition in the amount shown in Table 2. This composition was crosslinked or cured. The results of measurement of rubber physical properties are shown in Table 2.

TABLE 2

| | Addition amount (pbw) | Molding temperature (° C.) | Hardness (JIS) | Tensile strength (MPa) | Elongation (%) | Tear strength (kN/m) |
|---|---|---|---|---|---|---|
| Example 1 | 0.6 | 150 | 71 | 9.9 | 280 | 15 |
| Example 2 | 1.2 | 150 | 71 | 10.2 | 270 | 18 |
| Example 3 | 1.8 | 150 | 74 | 9.6 | 250 | 14 |
| Example 4 | 1.2 | 160 | 71 | 10.4 | 270 | 16 |
| Example 5 | 1.2 | 170 | 71 | 10.0 | 280 | 16 |
| Example 6 | 1.2 | 180 | 71 | 10.1 | 300 | 18 |

It is seen that the compositions exhibit consistent rubber physical properties despite a change of addition amount (Examples 1 to 3) and a change of molding temperature (Examples 4 to 6).

Comparative Examples 1 to 6

Six peroxides of a chemical structure different from that of the inventive peroxide, that is, free of an isopropyl monocarbonate group were added to the base composition. These compositions was crosslinked or cured. The results of measurement of rubber physical properties are shown in Table 3.

The amount of peroxide added was to give the same quantity of active oxygen as did 0.6 parts by weight of the inventive peroxide (used in Example 1).

The molding temperature was set to the range of one-minute half-life temperature ±10° C.

TABLE 3

| | Peroxide | Addition amount (pbw) | Molding temperature (° C) | Hardness (JIS) | Tensile strength (MPa) | Elongation (%) | Tear strength (kN/m) |
|---|---|---|---|---|---|---|---|
| Comparative Example 1 | Comparative peroxide 1 | 1.2 | 170 | 72 | 7.8 | 250 | 16 |

TABLE 3-continued

| | Peroxide | Addition amount (pbw) | Molding temperature (° C) | Hardness (JIS) | Tensile strength (MPa) | Elongation (%) | Tear strength (kN/m) |
|---|---|---|---|---|---|---|---|
| Comparative Example 2 | Comparative peroxide 2 | 0.7 | 170 | 70 | 6.2 | 190 | 13 |
| Comparative Example 3 | Comparative peroxide 3 | 0.8 | 150 | 70 | 7.7 | 180 | 15 |
| Comparative Example 4 | Comparative peroxide 4 | 0.6 | 190 | 64 | 8.0 | 340 | 24 |
| Comparative Example 5 | Comparative peroxide 5 | 1.3 | 150 | 59 | 6.2 | 290 | 16 |
| Comparative Example 6 | Comparative peroxide 6 | 0.6 | 190 | 66 | 8.4 | 270 | 17 |

Example 7

Using a rubber roll mill which is commonly used in the kneading of natural rubber of sulfur crosslinking type, the peroxide crosslinking composition of Example 1 was compounded, which was molded into an O-ring without noticeable problems.

The results are shown in Table 4.

Comparative Examples 7–8

Using a rubber roll mill which is commonly used in the kneading of natural rubber of sulfur crosslinking type, the base composition was compounded according to the addition crosslinking formulation. An attempt was made to mold the composition into an O-ring, but the composition remained uncured due to catalyst poisoning.

The same composition cured normally when a roll mill which is commonly used in the kneading of silicone rubber was used.

The composition and curing results are shown in Table 4.

TABLE 4

| | Example 7 | Comparative Example 7 | Comparative Example 8 |
|---|---|---|---|
| Addition crosslinker (pbw) | — | 1.1 | 1.1 |
| Regulator (pbw) | — | 0.2 | 0.2 |
| Perbutyl I (pbw) | 1.2 | — | — |
| Kneading roll mill | for natural rubber | for natural rubber | for silicone rubber |
| Molding temperature | 150° C. | 150° C. | 150° C. |
| Molding time | 10 min | 10 min | 10 min |
| Results of O-ring molding | effective molding | uncured probably due to crosslink inhibition | effective molding |

In summary, the fluororubber compositions of the invention have improved solvent resistance, chemical resistance, heat resistance and low-temperature properties, as well as satisfactory rubber physical properties, especially strength. The fluororubber compositions of the invention can thus be used in a variety of applications as parts requiring elasticity, for example, sealing materials (e.g., gaskets and packing), diaphragm materials and valve materials in automobile, aircraft, electric, electronic, machinery, chemical plant and semiconductor fields. They find a very wide range of industrial use.

What is claimed is:

1. A fluororubber composition comprising
    (A) a liquid perfluoro compound having at least two alkenyl groups in the molecule and a divalent perfluoroalkylene or perfluoropolyether structure in the backbone,
    (B) a compound capable of addition reaction having at least two hydrosilyl groups in the molecule,
    components (A) and (B) being combined in such amounts as to give a molar ratio of hydrosilyl groups in component (B) to alkenyl groups in component (A) of 0.1/1 to 0.99/1 and precured in the presence of an addition reaction catalyst to form a precured base,
    (C) 1 to 100 parts by weight per 100 parts by weight of component (A) of a reinforcing filler, and
    (D) 0.1 to 10 parts by weight per 100 parts by weight of component (A) of a peroxide crosslinking agent containing an isopropyl monocarbonate group in the molecule.

2. The composition of claim 1 wherein the perfluoro compound (A) is of the following general formula (1):

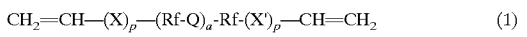

$$CH_2=CH-(X)_p-(Rf-Q)_a-Rf-(X')_p-CH=CH_2 \quad (1)$$

wherein X is a divalent group: $-CH_2-$, $-CH_2O-$, $-CH_2OCH_2-$ or $-Y-NR^1-CO-$ wherein Y is a divalent group represented by $-CH_2-$ or the structural formula (I):

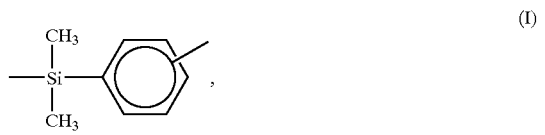

(I)

and $R^1$ is hydrogen or a substituted or unsubstituted monovalent hydrocarbon group, X' is a divalent group: $-CH_2-$, $-OCH_2-$, $-CH_2OCH_2-$ or $-CO-NR^1-Y'-$ wherein Y' is a divalent group represented by $-CH_2-$ or the structural formula (I'):

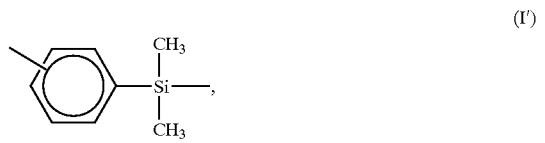

(I')

and $R^1$ is as defined above,

Rf is a divalent perfluoroalkylene or divalent perfluoropolyether group, p is independently equal to 0 or 1, Q is a group of the following general formula (2), (3) or (4):

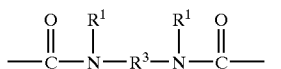 (2)

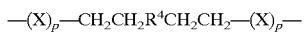 (3)

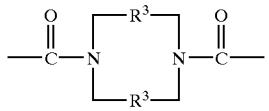 (4)

wherein X, X', p, and $R^1$ are as defined above, $R^3$ is a substituted or unsubstituted divalent hydrocarbon group, and $R^4$ is a substituted or unsubstituted divalent hydrocarbon group which may be separated by at least one intervening atom selected from oxygen, nitrogen, silicon and sulfur atoms, or a group of the following general formula (5) or (6):

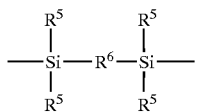 (5)

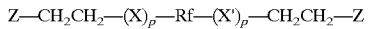 (6)

wherein $R^5$ is a substituted or unsubstituted monovalent hydrocarbon group and $R^6$ is a group containing in its backbone structure at least one atom selected from carbon, oxygen, nitrogen, silicon and sulfur atoms, and "a" is an integer inclusive of 0.

3. The composition of claim 1 wherein the compound capable of addition reaction having at least two hydrosilyl groups in the molecule (B) is a compound of the following general formula (7) or (8):

Z—CH$_2$CH$_2$—(X)$_p$—Rf—(X')$_p$—CH$_2$CH$_2$—Z (7)

Rf—(X)$_p$—CH$_2$CH$_2$—Z (8)

wherein X, X', p, and Rf are as defined above,
Z is a group of the general formula (9):

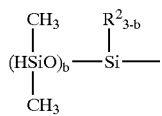 (9)

wherein $R^2$ is a substituted or unsubstituted monovalent hydrocarbon group, and b is 1, 2 or 3 in the case of formula (7) and 2 or 3 in the case of formula (8).

4. The composition of claim 1 wherein the reinforcing filler (C) comprises fumed silica or fumed silica treated with a surface treating agent containing silicon in the molecule.

5. The composition of claim 1 wherein the peroxide crosslinking agent containing an isopropyl monocarbonate group in the molecule (D) has the formula (10):

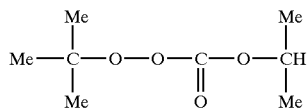 (10)

wherein Me is methyl.

6. A method for preparing the composition of claim 1, comprising the steps of combining components (A) to (C) for reaction and then adding and mixing component (D) with the resulting mixture.

7. The composition of claim 2 wherein the compound capable of addition reaction having at least two hydrosilyl groups in the molecule (B) is a compound of the following general formula (7) or (8):

Z—CH$_2$CH$_2$—(X)$_p$—Rf—(X')$_p$—CH$_2$CH$_2$—Z (7)

Rf—(X)$_p$—CH$_2$CH$_2$—Z (8)

wherein X, X', p, and Rf are as defined above,
Z is a group of the general formula (9):

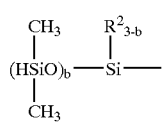 (9)

wherein $R^2$ is a substituted or unsubstituted monovalent hydrocarbon group, and b is 1, 2 or 3 in the case of formula (7) and 2 or 3 in the case of formula (8).

8. The composition of claim 7 wherein the reinforcing filler (C) comprises fumed silica or fumed silica treated with a surface treating agent containing silicon in the molecule.

9. The composition of claim 8 wherein the peroxide crosslinking agent containing an isopropyl monocarbonate group in the molecule (D) has the formula (10):

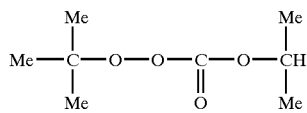 (10)

wherein Me is methyl.

* * * * *